United States Patent [19]
Knaup

[11] Patent Number: 6,013,914
[45] Date of Patent: Jan. 11, 2000

[54] CIRCUIT FOR DETECTING ELECTROMAGNETIC RADIATION

[75] Inventor: Gerhard Knaup, Einhausen, Germany

[73] Assignee: Heimann Optoelectronics GmbH, Wiesaden, Germany

[21] Appl. No.: 08/855,671

[22] Filed: May 14, 1997

[30] Foreign Application Priority Data

May 14, 1996 [DE] Germany ............... 196 19 459

[51] Int. Cl.[7] .................................................. G01J 5/06
[52] U.S. Cl. ........................... 250/338.3; 250/338.1
[58] Field of Search ............................ 250/338.3, 338.1

[56] References Cited

U.S. PATENT DOCUMENTS 4,626,687  12/1986  Nora et al. .................... 250/338.1
4,697,081   9/1987  Baker ............................ 250/338.1
4,933,559   6/1990  Tamura et al. ................ 250/338.1

OTHER PUBLICATIONS

Boylestad et al. "Electronic Devices and Circuit Theory" p. 630, 1972.

Primary Examiner—Edward P. Westin
Assistant Examiner—Richard Hanig
Attorney, Agent, or Firm—Hill & Simpson

[57] ABSTRACT

A circuit for detecting electromagnetic radiation such as infrared radiation includes one or more sensor elements which convert the electromagnetic radiation into an electric signal. A field effect transistor receives the electric signal of the sensor elements. An impedance which is ohmic, inductive, or both is connected between the supply voltage and the field effect transistor to filter high frequencies so that false detections by the detecting circuit are eliminated.

14 Claims, 3 Drawing Sheets

CIRCUIT FOR DETECTING ELECTROMAGNETIC RADIATION

BACKGROUND OF THE INVENTION

1. Field of the Invention

The present invention relates generally to a circuit for detecting electromagnetic radiation and, in particular, a circuit for detecting electromagnetic radiation having at least one sensor element which converts the radiation into an electrical signal and having a field effect transistor receiving the electrical signal.

2. Description of the Related Art

Detectors are known for detecting electromagnetic radiation such as heat radiation or infrared radiation. One application for such detectors is as motion detectors. Motion detectors detect, for example, persons by detecting the heat radiation emitted by the persons. After detection of a person, the motion detector emits a signal which can be further processed as desired. For example, a door opener may be actuated, a light may be switched on, or an alarm may be triggered upon the detection of a person within the sensing field of the motion detector. The signal which is being sought for use in these further processes, which is infrared radiation from the person being detected, generally changes at a low frequency. An important region for a signal detection is around 1 Hz. The frequency of the signal results from the speed with which the infrared source, the person, passes by the sensor elements.

A known sensing circuit is shown in FIG. 1 as an example of one design. A sensor which operates capacitively serves as the sensor element. The sensor element of the illustrated exemplary circuit is a pyroelectric cell 2. The sensor cell produces charges corresponding to a change in the intensity of the infrared radiation striking it, and stores these charges capacitively. One terminal of the sensor element is connected to a fixed reference potential, such as ground. The other terminal of the sensor 2 supplies a voltage as an output signal. Since the output has an extremely high impedance, an impedance converter is connected to the output so that the evaluation circuit which is connected for utilizing the sensor output sees a sufficiently low equivalent resistance for the circuit 1. A high impedance resistor 4 is connected in parallel to the sensor element 2. The resistor 4 ensures that charges which are accumulated in the capacitive sensor 2 are eventually discharged so that the charge disappears after the heat source which triggered the charge has disappeared. The impedance converter in the standard circuit is a field-effect transistor 3. One terminal of the field-effect transistor 3 is connected to a supply voltage $U_B$ while the other terminal of the field-effect transistor 3 supplies the output signal $U_A$ for further processing. In a circuit using an n-channel junction gate field-effect transistor (FET) 3, the sensor element 2 is connected between ground and the gate of the FET, the drain is connected to the supply voltage $U_B$ and the source is connected to supply the output signal $U_A$.

The sensor elements 2 have an extremely high characteristic impedance which is on the order of magnitude of 100 G ohms. As a result, the output signal of the sensor elements is very weak, rendering the entire circuit unusually susceptible to electrical disturbances. Radio frequency electrical disturbances are mainly the cause of problems in the sensor circuit For the present invention, radio frequency refers to frequencies in the MHZ and GHz range. Radio frequencies which are coupled in via the supply lines are particularly disturbing to the circuit operation. However, directly received radio frequency disturbances also play a part, such as those from radio telephone devices or the like. The radio frequency disturbances lead to false detections and, thus, malfunctioning of the circuit 1.

In an effort to reduce such false detections, a capacitor 5 has been used, which is connected between the signal output 7 and ground. The capacitor functions as a low pass filter which short circuits the high output frequencies so that these high frequencies are attenuated at the output of the circuit.

SUMMARY OF THE INVENTION

An object of the present invention is to provide a circuit for detecting electromagnetic radiation with which false detections that may be caused by radio frequency disturbances are further minimized.

This and other objects and advantages of the invention are provided by a circuit having at least one sensor which has a high impedance, an impedance converter, and an impedance connected in a power supply line to said impedance to filter out high frequencies. Two sensors may be provided connected so as to cancel environmental effects and provide more accurate sensing of an electromagnetic source, such as a person. The impedance converter is preferably a field effect transistor and the impedance in its power supply is ohmic, inductive, or both.

DETAILED DESCRIPTION OF THE PREFERRED EMBODIMENTS

Figure 1:
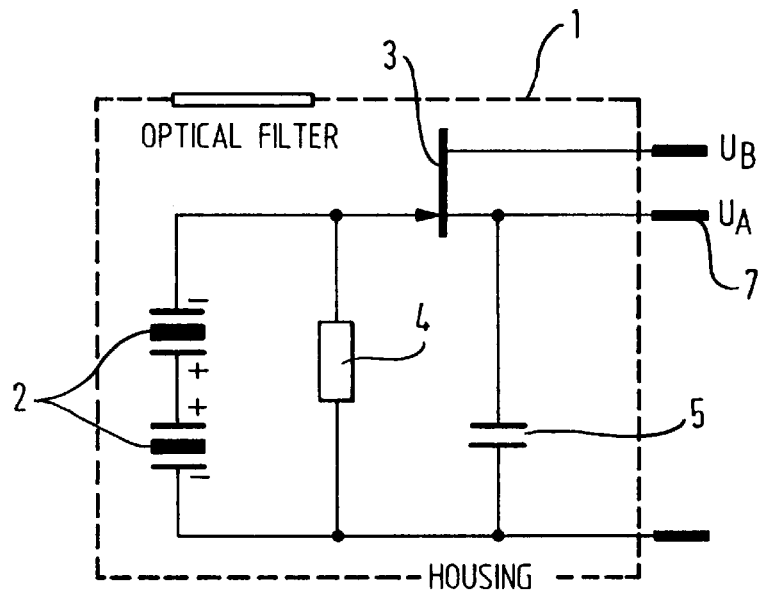
FIG. 1 is a circuit diagram which shows a related circuit incorporating an electromagnetic sensor.
Figure 2:
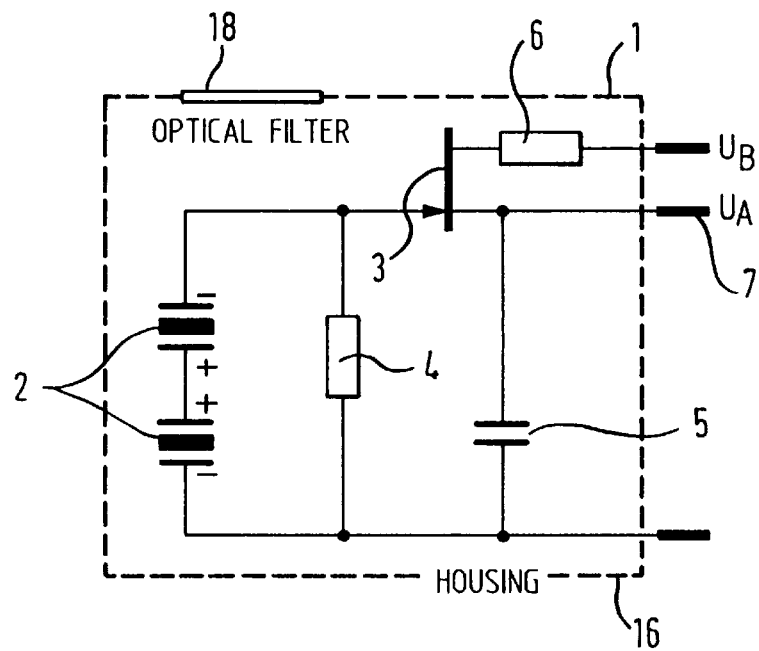
FIG. 2 is a circuit diagram which shows a first embodiment of the present invention.

In FIG. 2, two sensor elements 2 for sensing infrared radiation are connected in series to one another in antipolar fashion. The purpose for the antipolar connection of the sensors will be described in greater detail below. A discharge resistor 4 of a high impedance is connected in parallel with the series circuit of the sensor elements 2 so that charges produced in response to infrared radiation striking the sensor elements 2 can be discharged over time. Upon the incidence of infrared radiation onto the sensor elements 2, the sensor elements 2 produce charges that cause a voltage at the terminals of the parallel circuit according to the formula $U=Q/C$. If the infrared radiation which is a irradiating the sensor elements 2 disappears the charge that has arisen in the sensor elements 2 is discharged via the resistor 4. The voltage signal at the terminals of the parallel circuit thus disappears. One terminal of the parallel circuit is connected to the gate of a field effect transistor 3 which serves as an impedance converter for the sensor elements 2. A first power terminal, the source, for example, of the field effect transistor 3 (FET) supplies an output signal $U_A$ for the present circuit.

To make the circuit 1 insensitive to radio frequency disturbances, an impedance 6 which is either a purely ohmic impedance or an ohmic and inductive impedance or a purely inductive impedance is connected between the second power terminal, the drain, for example, of the field effect transistor 3 and the supply voltage $U_B$. Stray radio frequency voltages which arise in the circuit are coupled from the drain to the gate of the field effect transistor 3 via the drain-gate coupling capacitance of the transistor. The voltage produced at the gate of the field effect transistor 3 across the high impedance resistor 4 by the sensor elements 2 is transmitted to the output $U_A$ for use in subsequent processing. The additional drain impedance 6 which is added according to the present invention causes the stray radio frequency voltage signals to be divided between the drain resistance, the drain-gate coupling capacitance, and the capacitance of the sensor elements 2. Since the capacitive reactances of the field effect transistor 3 are small in comparison to the drain impedance 6, the majority of the stray radio frequency voltages drop off (are suppressed) at the additional drain impedance 6.

The drain impedance 6 can have an ohmic resistance, an inductance, or a combination of the two. If necessary, the stray radio frequency voltage signals are divided between the inductive reactance, the drain-gate coupling capacitance and the capacitance of the sensor elements 2. Since the inductive reactance increases with frequency, the radio frequency suppression is improved at higher frequencies even more in comparison to a purely ohmic drain resistance element.

Figure 3:
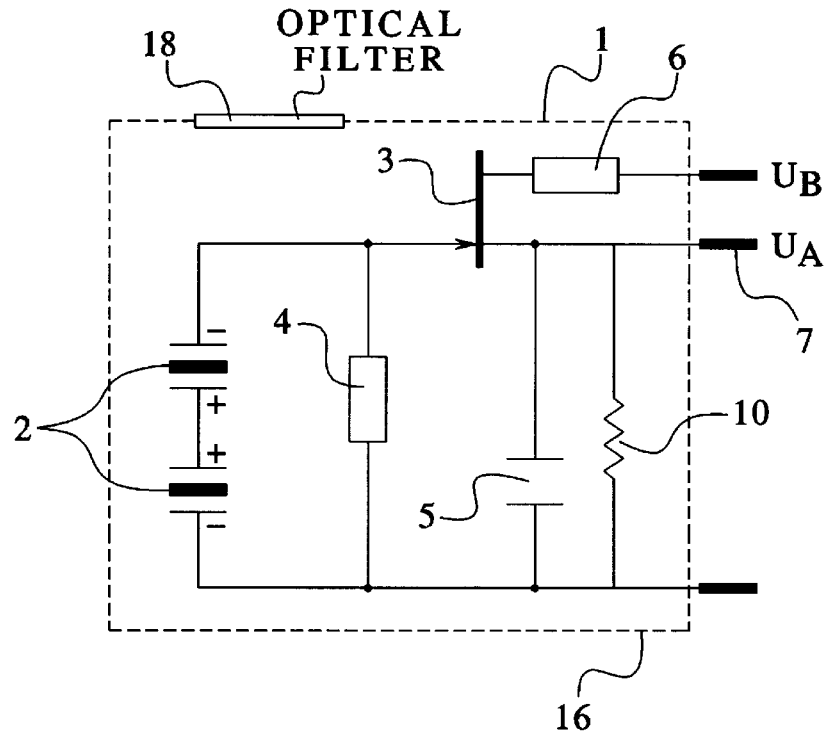
FIG. 3 is a circuit diagram of another embodiment with a source resistor.

A source resistor 10 as shown in FIG. 3 is connected between the output terminal 7 and ground to bias the field effect transistor 3 for operation.

Figure 4:
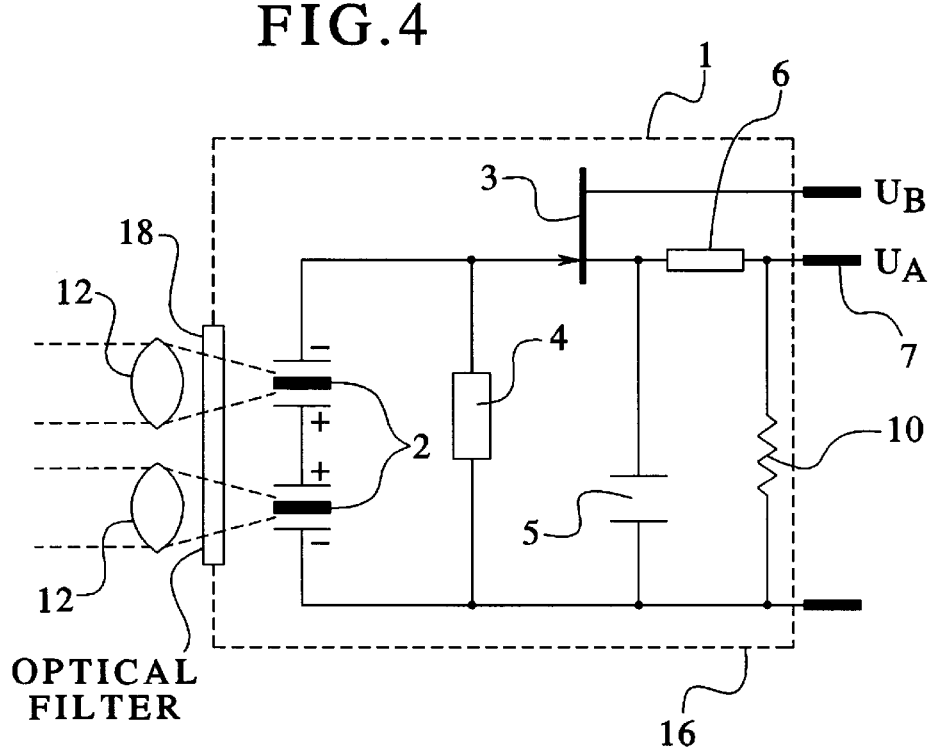
FIG. 4 is a circuit diagram of yet a further embodiment with the inventive impedance at the source lead and an optical system for the sensors.

It is within the scope of the present invention to connect the impedance 6 between the first power terminal of the field effect transistor 3 and the output terminal 7 of the circuit 1 as shown in FIG. 4. This has the effect of suppressing the radio frequency disturbances in the circuit. The magnitude of the output signal is as a result decreased, which is undesirable so that the first described embodiment of FIG. 2 is preferred. In this case, the impedance 6 would form a voltage divider with the above-mentioned source resistor 10 and the output signal would be obtained from the center connection of the voltage divider, which would attenuate the output signal.

FIG. 4 shows an embodiment in which two pyroelectrical cells 2 are connected together in antipolar fashion. In a preferred embodiment, an optical system 12 is provided which is oriented so that the two pyroelectrical sensor cells 2 receive infrared radiation from difference spatial regions. If a person is to be detected by the sensor, the orientation of the pyroelectrical sensor cells 2 and or of the optical system 12 is selected so that the persons to be detected can normally pass first through a region monitored by the first cell and then through a region monitored by the second cell. An alternating signal is clearly present upon sensing of a person, since the pyroelectric sensor cells 2 do not respond simultaneously but rather respond spatially, and thus temporally, one after the other. If a surface which is within the area being monitored heats up uniformly, such as due to solar radiation, the output signals of the pyroelectric sensor cells 2 mutually cancel each other out so that false detections of a person by the sensor are reduced.

Figure 5:
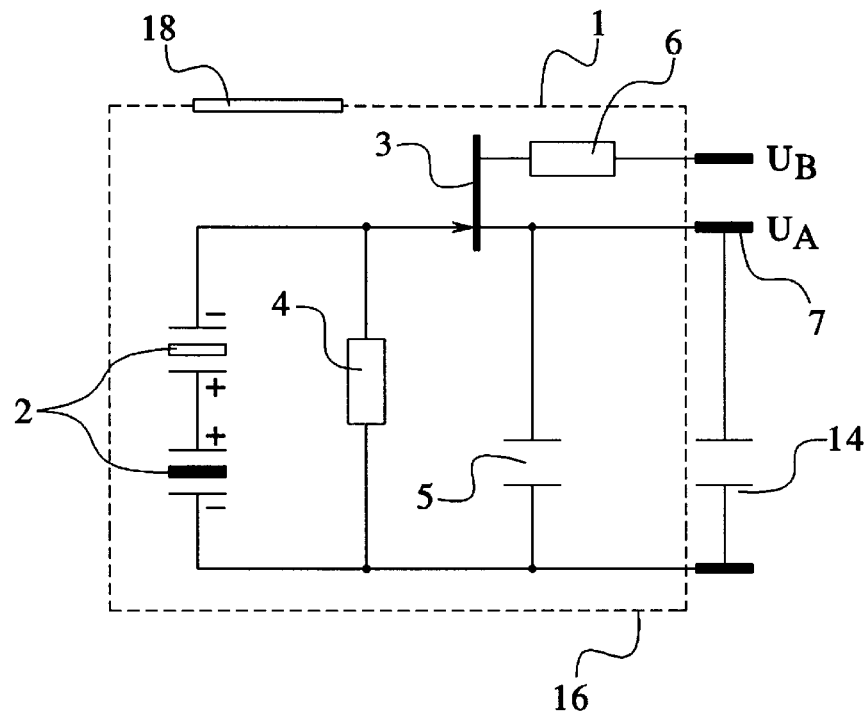
FIG. 5 is a circuit diagram with a filter capacitor.

In addition to providing the resistor or impedance 6 between the supply voltage $U_B$ and the field effect transistor 3, a capacitor 14 as shown in FIG. 5 which operates as a lowpass filter can be provided at the output terminal $U_A$. The capacitor 14 filters out radio frequency disturbances. The capacitor 14 is connected between the output terminal 7 and ground. The parallel circuit of the pyroelectric sensor cells 2 and the discharge resistor 4 lies between the gate of the field effect transistor 3 and ground in this circuit.

Figure 6:
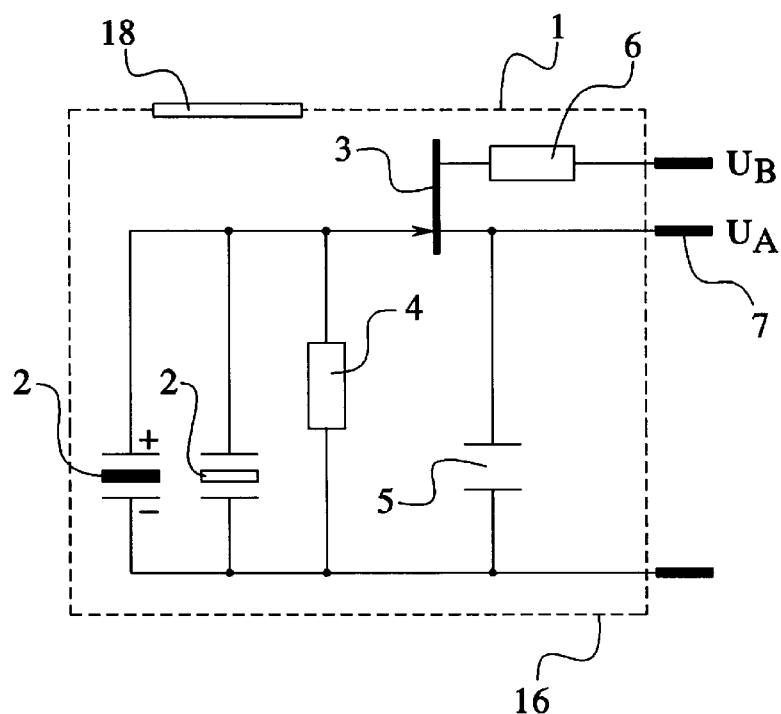
FIG. 6 is an embodiment with parallel sensors.

An alternative embodiment of the circuit provides that the sensors 2 are connected in parallel with one another, as shown in FIG. 6.

The entire circuit can be housed in the housing, such as a standard TO-5 transistor housing 16. Only the terminals for the supply voltage, for the ground and for the output signal for processing appear externally to the housing. In addition, the housing includes a window or optical filter 18 through which the pyroelectric sensor cells 2 receive the heat radiation to be detected.

The pyroelectric sensor cells 2 have a sensitivity on the order of magnitude of approximately 3.5 kV/W; at 0.5 $\mu$W which accordingly results in a voltage of less than 2 mV due to the high characteristic impedance of the sensors. The resistance 4 has a value of between 20 G ohms and 300 G ohms, and in a preferred embodiment is 75 G ohms. The impedance 6 which serves for the radio frequency suppression has an ohmic portion of its impedance between 100 ohms and 470 k ohms, and is preferably 10 k ohms. However, the impedance 6 can be purely inductive. The field effect transistor 3 is in one embodiment and n-channel junction gate field effect transistor, but an n-channel depletion MOSFET may also be used. The capacitor 5 has a capacitance of between 100 pF and 10 nF and is preferably of a capacitance of 270 pF. The voltage gain for the field effect transistor 3 is less than 1, and typically is approximately 0.9.

The output signal at the output terminal 7 can be further processed by suitable circuits, such as operational amplifiers. The source resistor which is mentioned above may also be a part of the external circuit as an alternative embodiment.

Although other modifications and changes may be suggested by those skilled in the art, it is the intention of the inventor to embody within the patent warranted hereon all changes and modifications as reasonably and properly come within the scope of his contribution to the art.

I claim:

1. A circuit for detecting electromagnetic radiation, comprising:
    at least one pyroelectric sensor element connected to convert electromagnetic radiation which strikes at at least one sensor element into an electric signal;
    an n-channel junction field effect transistor connected to receive said electric signal from said at least one sensor element, said field effect transistor having a source terminal from which an output signal of said circuit is outputed, and said field effect transistor having a drain terminal; and
    an inductor and resistor connected to said drain terminal of said field effect transistor through which a supply voltage is supplied to said field effect transistor.

2. A circuit as claimed in claim 1, further comprising: a resistor connected in parallel to said at least one sensor element.

3. A circuit as claimed in claim 1, wherein said at least one sensor element is connected between a gate of said field effect transistor and ground.

4. A circuit as claimed in claim 1, further comprising:
    a capacitor connected between said first power terminal of said field effect transistor and ground.

5. A circuit as claimed in claim 1, wherein said at least one sensor element detects infrared radiation.

6. A circuit as claimed in claim 5, wherein said at least one sensor element is a pyroelectric cell.

7. A circuit as claimed in claim 6, wherein said at least one sensor element is a first sensor element and further comprising:

a second sensor element which is a pyroelectric cell, said pyroelectric cells being connected in antipolar fashion.

8. A circuit as claimed in claim 1, further comprising:

a housing enclosing said at least one sensor element and said field effect transistor and said impedance.

9. A circuit as claimed in claim 1, wherein said field effect transistor is an n-channel junction gate field effect transistor.

10. A circuit as claimed in claim 1, wherein said field effect transistor is connected as an impedance converter.

11. A circuit as claimed in claim 1, wherein said impedance further includes an inductance.

12. A circuit as claimed in claim 7, wherein said two pyro electric cells are connected serially.

13. A circuit as claimed in claim 7, wherein said two pyroelectric cells are connected in parallel to one another.

14. A circuit for detecting electromagnetic radiation, comprising:

at least one pyroelectric sensor element connected to convert electromagnetic radiation which strikes at at least one sensor element into an electric signal;

an n-channel junction field effect transistor connected to receive said electric signal from said at least one sensor element, said field effect transistor having a source terminal from which an output signal of said circuit is outputed, and said field effect transistor having a drain terminal; and an inductor and resistor connected to said drain terminal of said field effect transistor through which a supply voltage is supplied to said field effect transistor.

* * * * *

UNITED STATES PATENT AND TRADEMARK OFFICE
CERTIFICATE OF CORRECTION

PATENT NO. : 6,013,914
DATED : January 11, 2000
INVENTOR(S) : Gerhard Knaup

It is certified that error appears in the above-identified patent and that said Letters Patent is hereby corrected as shown below:

On the title page: Item [73] Assignee: address should read
-- Wiesbaden, Germany --.

Signed and Sealed this

Twentieth Day of February, 2001

Attest:

NICHOLAS P. GODICI

*Attesting Officer*    *Acting Director of the United States Patent and Trademark Office*